(12) United States Patent
Beck

(10) Patent No.: US 9,616,745 B2
(45) Date of Patent: Apr. 11, 2017

(54) ACTUATION DEVICE

(71) Applicant: ILLINOIS TOOL WORKS INC., Glenview, IL (US)

(72) Inventor: Christian Beck, Roettingen (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 2 days.

(21) Appl. No.: 14/382,023

(22) PCT Filed: Feb. 27, 2013

(86) PCT No.: PCT/US2013/027869
§ 371 (c)(1),
(2) Date: Aug. 29, 2014

(87) PCT Pub. No.: WO2013/130495
PCT Pub. Date: Sep. 6, 2013

(65) Prior Publication Data
US 2015/0061314 A1    Mar. 5, 2015

(30) Foreign Application Priority Data

Mar. 2, 2012 (DE) .......................... 10 2012 004 078

(51) Int. Cl.
  *B60K 15/05* (2006.01)
  *E05F 15/12* (2006.01)
  (Continued)

(52) U.S. Cl.
  CPC .......... *B60K 15/05* (2013.01); *E05B 47/0001* (2013.01); *E05B 81/66* (2013.01);
  (Continued)

(58) Field of Classification Search
  CPC ............ B60K 15/05; B60K 2015/0546; B60K 2015/0576; B60K 2015/0584; E05B 81/66;
  (Continued)

(56) References Cited

U.S. PATENT DOCUMENTS 6,234,557 B1 * 5/2001 Bae .................... B60K 15/0406
                                                                220/86.2
7,044,444 B2 * 5/2006 Haubold ................ F15B 15/10
                                                                137/554
(Continued)

FOREIGN PATENT DOCUMENTS

DE         10050558 A1     4/2002
DE     102008057933 A1     7/2010
(Continued)

OTHER PUBLICATIONS

ISR and WO for PCT/US2013/027869 mailed Aug. 19, 2013.

*Primary Examiner* — Joseph D Pape
*Assistant Examiner* — Dana Ivey
(74) *Attorney, Agent, or Firm* — Hauptman Ham, LLP

(57) ABSTRACT

The invention relates to an actuation device for a flap mounted moveably on a component between a closed position and an opened position, in particular for a flap mounted moveably on a housing of an automobile, comprising: a first actuation part and a second actuation part which are designed to engage with one another in a movement direction, locking means with a locking reception provided on the first or second actuation part and a locking element provided on the other of the first or second actuation part, wherein the locking element engages in the locking reception during engagement of the actuation parts and thus holds the actuation parts together in a locking position, wherein the locking reception has sufficient size so that in the locking position a relative movement between the locking element and the
(Continued)

Figure 1:
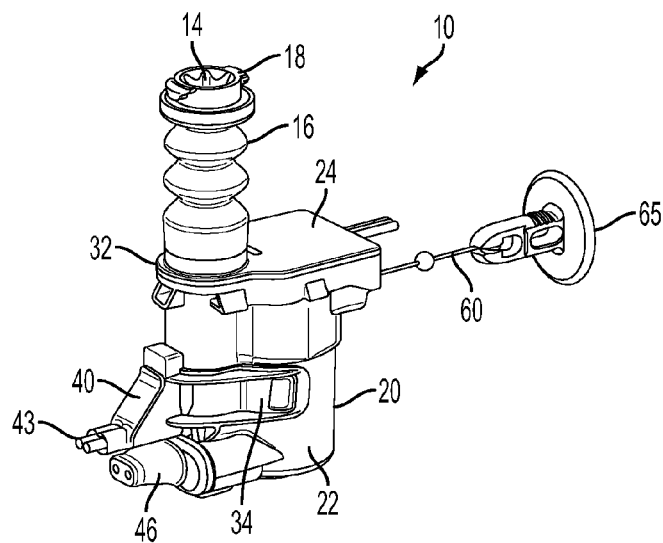

locking reception in the movement direction of the actuation parts and thereby a corresponding relative movement of the actuation parts in their movement direction with regard to one another is possible, and a sensor device which is designed to detect a relative movement between the locking element and the locking reception in the movement direction in the locking position.

20 Claims, 2 Drawing Sheets

(51) Int. Cl.
| | | |
|---|---|---|
| *E05B 83/34* | (2014.01) | |
| *E05B 81/66* | (2014.01) | |
| *E05F 15/611* | (2015.01) | |
| *E05B 47/00* | (2006.01) | |

(52) U.S. Cl.
CPC ............ *E05B 83/34* (2013.01); *E05F 15/611* (2015.01); *B60K 2015/0546* (2013.01); *B60K 2015/0576* (2013.01); *B60K 2015/0584* (2013.01); *E05B 47/0012* (2013.01); *E05B 2047/0021* (2013.01); *Y10T 16/56* (2015.01)

(58) Field of Classification Search
CPC ............ E05B 83/34; E05B 2047/0021; E05B 47/0012; E05B 47/0001; E05F 15/12; E05F 15/611; Y10T 16/56
USPC .............................. 296/97.22, 155; 220/86.2
See application file for complete search history.

(56) References Cited

U.S. PATENT DOCUMENTS

| | | |
|---|---|---|
| 8,353,553 B2 | 1/2013 | Beck |
| 8,398,127 B2 | 3/2013 | Persiani et al. |
| 2007/0289397 A1* | 12/2007 | Ritter ................... E05F 15/622 74/22 A |
| 2013/0102163 A1 | 4/2013 | Basavarajappa et al. |
| 2014/0084599 A1 | 3/2014 | Beck |

FOREIGN PATENT DOCUMENTS

| | | |
|---|---|---|
| DE | 102011101838 A1 | 11/2012 |
| GB | 2149447 A | 6/1985 |
| WO | 2005105505 A1 | 11/2005 |
| WO | 2011120719 A1 | 10/2011 |

* cited by examiner

ACTUATION DEVICE

RELATED APPLICATIONS

The present application is a National Phase of International Application Number PCT/US2013/027869 filed Feb. 27, 2013 and claims priority to German Application Number 10 2012 004 078.4 filed Mar. 2, 2012.

The invention relates to an actuation device for a flap mounted moveably on a component between a closed position and an opened position, in particular for a flap mounted moveably on a housing of an automobile.

It is known to actuate, for example, fuel tank flaps of automobiles using so-called push-push devices. A corresponding actuation device is described in DE 10 2008 057 933 A1. The actuation device is secured to a tank housing, the device having an actuation end which protrudes from the housing in the installed state. The known actuation device has a tappet which is supported in an axially movable manner, on the outer periphery of which a control cam is provided in order to produce the push-push kinematics. During operation, the fuel tank flap co-operates with the actuation end of the actuation device protruding from the housing. In particular, the fuel tank flap rests with its inner side on the actuation end in the closed state. As a result of the push-push kinematics, the actuation device, by pressing the fuel tank flap in the direction of the automobile bodywork, can be moved into an unlocking position in which the actuation end protrudes further from the tank housing and the fuel tank flap is lifted slightly from the bodywork surface. The fuel tank flap can then be manually gripped and pivoted completely open. When the flap is subsequently closed and a force is applied to the actuation end of the actuation device in this instance, it is again moved into a locking position.

So that the fuel tank flap cannot unintentionally pivot open in the locking position, it is pretensioned by a spring into the closed position. During operation of the vehicle, but also already during assembly, forces act on the fuel tank flap. It is possible to mention by way of example a pivot assembly or overhead assembly of the vehicle, in which the gravitational force acts on the fuel tank flap in the opening direction of the flap. Furthermore, washing installations may be mentioned by way of example, where force may also be applied in the opening direction of the flap, in particular during the drying operation. In these cases, unintentional opening of the fuel tank flap must be prevented in a reliable manner. The spring which pretensions the fuel tank flap into the closed position must therefore apply a comparatively high resilient force. This resilient force must be overcome by a user when opening the flap. This can reduce comfort. Furthermore, in the event of the comparatively high resilient forces, undesirable noise may be produced during the actuation.

According to the older, previously unpublished German patent application from the Applicant with the file reference 10 2011 101 838.0, a first actuation part of an actuation device is secured to the flap so that it moves together with the flap when the flap is moved, and a second actuation part is secured to the component which is, for example, securely arranged in or on an automobile. This separation of the actuation parts makes a resilient force for retaining the flap in the closed position superfluous. Instead, the flap is secured to the second actuation part by means of the first actuation part which is provided thereon, and is consequently secured to the component provided with the flap. The actuation device uses push-push kinematics so that the flap can be released from the securing position in a manner known per se by the flap being pressed manually inwards so that it subsequently moves into a position which is at least partially pivoted open.

It is sometimes desirable, for example, before opening a fuel tank flap, to carry out preparatory measures. For example, tanks which are under considerable pressure are used in hybrid vehicles. Before access to the tank is provided, it is therefore necessary to remove the air from the tank and consequently to reduce pressure in the tank.

Based on the prior art explained, an object of the invention is to provide an actuation device of the type mentioned in the introduction which enables preparatory measures to be carried out in a simple manner before the flap is opened.

The invention achieves this object by the subject-matter of claim 1. Advantageous embodiments are set out in the dependent claims, the description and the figures.

The invention solves the problem with an actuation device for a flap mounted moveably on a component between a closed position and an opened position, in particular for a flap mounted moveably on a housing of an automobile, comprising: a first actuation part and a second actuation part which are designed to engage with one another in a movement direction, locking means with a locking reception provided on the first or second actuation part and a locking element provided on the other of the first or second actuation part, wherein the locking element engages in the locking reception during engagement of the actuation parts and thus holds the actuation parts together in a locking position, wherein the locking reception has sufficient size so that in the locking position a relative movement between the locking element and the locking reception in the movement direction of the actuation parts and thereby a corresponding relative movement of the actuation parts in their movement direction with regard to one another is possible, and a sensor device which is designed to detect a relative movement between the locking element and the locking reception in the movement direction in the locking position.

The flap may be a flap in or on an automobile. For example, the flap may be a fuel or charging flap of an automobile which is moveably mounted, in particular pivotably mounted, on a fuel or charging housing of the automobile. In the open position of the fuel or charging flap, for example, a fuel tank of the automobile can then be filled with fuel or electrical drive components of the automobile can be charged. However, other applications are also possible, both in the automotive sector and outside the automotive sector.

The actuation parts may be moved into a locking position by closing the flap. This can, for example, be carried out manually by pressing on the flap. The actuation parts may move into engagement with each other in particular at least in an axial direction. In the locking position, the first and the second actuation parts cannot be released from each other. To this end, the locking position must first be released. According to the invention, the configuration of the locking reception and the locking element which engages therein is such that in the locking position a relative movement is possible between the locking element and the locking reception in the movement direction of the actuation parts, that is to say, in particular in an axial direction, and consequently a corresponding relative movement of the actuation parts in this movement direction relative to each other. For example, such a relative movement in the locking position can be produced manually by the flap being pressed slightly inwards by hand. This relative movement is carried out with the locking position being maintained. There is thus (still) no unlocking of the actuation parts with the permitted relative movement in the locking position.

According to the invention there is further provided a sensor device which detects a relative movement in the locking position. A detection of such a movement may act as an indicator for various other measures, for example, an unlocking of the actuation device or other measures such as removal of air from a pressurized tank of an automobile, for example, a hybrid vehicle, that is closed by means of the flap. For example, it is possible for air to be removed from a tank first and for the actuation device to be unlocked only afterwards.

At the same time in the locking position, the flap is securely locked to the component. Unintentional opening of the flap, for example, a fuel tank flap, is reliably prevented thereby in a washing installation or during pivot or overhead assembly of an automobile. It is not necessary to apply any high resilient force which retains the flap in the closed position. The comfort is thereby increased when the flap is used. Furthermore, noises which are produced by such resilient forces during operation and which are perceived to be unpleasant by a user are prevented. For reasons of comfort, there may also be provision in the invention for the flap to be pretensioned into the closed position by means of resilient force. However, the corresponding resilient force can substantially be freely selected and may in particular be considerably lower than in the prior art. In a manner which is also known per se, the resilient force may have a return point so that the flap is pretensioned into the open position from a specific degree of opening.

At the same time, a high level of sealing with respect to the infiltration of moisture or dirt is achieved in the closed or open position of the flap. To this end, corresponding sealing lips may be provided. In this instance, the actuation device is distinguished by robustness and a simple structure with a particularly small number of components. Furthermore, it has a small structural size so that it can also be used in small fuel or charging housings. The actuation device has a modular structure and is consequently intended to be configured in a substantially flexible manner in accordance with the corresponding customer requirements or can be adapted to existing systems. The significant components of the actuation device, in particular the actuation parts, may comprise a plastics material. The actuation device according to the invention can also be used with self-opening flap systems. In a simple manner, the locking according to the invention can further be combined with a central locking of an automobile.

The first actuation part may be intended to be fastened on the flap and moved with the flap upon a movement of the flap between the closed position and the opened position, wherein the second actuation part is to be fastened on the component. The first actuation part may be able to be fastened on the flap by means of a catch connection or a bayonet connection and/or the second actuation part may be able to be fastened on the component by means of a catch connection or a bayonet connection. Therefore, the first actuation part is fastened to the flap in this embodiment and moves together with the flap when it is moved. The second actuation part is fastened to the component which is generally fixedly arranged on or in the automobile and accordingly does not move when the flap moves. When the flap moves, the first actuation part is also moved at least in an axial direction. However, the first actuation part can also be moved in other directions, for example, the first actuation part also carries out a pivot movement when the flap is pivoted. However, its movement also has an axial component so that the first actuation part can be brought into engagement with the second actuation part, in particular in an axial direction. In this embodiment, the first and second actuation part are separated from each other. Simple locking of the flap to the component is thereby achieved, without additional complex locking measures being required for this purpose. Simply owing to the separation of the first actuation part from the second actuation part and the arrangement of the first actuation part on the flap and the second actuation part on the component, opening of the flap is prevented in the locking position.

According to another embodiment, there may be provision for one of the actuation parts to comprise a tappet on the outer circumference of which the locking reception is provided and for the other of the actuation parts to comprise a housing in which the locking element is moveably mounted, wherein the tappet enters the housing in an axial direction through an entrance opening for reaching the locking position, wherein the locking element engages with the locking reception. A particularly robust and compact and at the same time structurally simple structure is thereby achieved. The tappet may have a cylindrical basic form and is introduced in the housing during the locking of the actuation parts. The first actuation part may have the tappet and the second actuation part the housing with the locking element. However, it is also possible for the first actuation part to have the housing and the locking element and the second actuation part to have the tappet. The tappet may have, between the locking reception and the free end thereof, a portion which tapers in the direction of the free end. By means of such a portion which tapers, for instance, in a conical manner, the locking element, when the tappet is introduced into the housing, can be guided back into the locking reception which is located behind the tapered portion starting from the free end. This is particularly important when the locking element is pretensioned into a locking position by resilient means. When the tappet is introduced, it then slides along the outer side of the tappet until it engages in the locking reception.

In another embodiment, there may be provision for the actuation part having the housing to comprise a bolt mounted so as to be axially moveable in the housing, wherein the bolt is pretensioned in the direction of the entrance opening of the housing by spring means, wherein the tappet presses the bolt against the spring means during an axial movement into the housing and thereby pretensions the spring means. The bolt is arranged in the housing so as to be able to be moved in an axial direction. The spring means may be in direct contact with the bolt at the side of the housing facing away from the tappet. The spring means may, for example, be a spring. When entering the housing, the tappet therefore comes into contact with the bolt and presses it further into the housing counter to the resilient force of the spring means. The spring means thus provide a resilient pretensioning which attempts to press the bolt against the tappet out of the housing. The locking element retains the first actuation part against this resilient pretensioning in the locked position so that the first actuation part cannot be released from the second actuation part. To this end, the locking must first be released. In the unlocked state of the actuation parts, the locking element may rest on an outer side of the bolt.

The sensor device according to the invention may comprise a Hall sensor which detects the movement of a magnet which is moved during a relative movement between the locking element and the locking reception. The magnet may, for example, be arranged on the bolt. Particularly effective and reliable detection of a movement of the first actuation part relative to the second actuation part in the locking position is thereby detected. Naturally, it is possible according to the invention, in addition to such a sensor device, for other sensor devices also to be provided, which may also comprise such Hall sensors which detect the movement of a magnet. For example, a sensor device which determines the locking position of a locking element may be provided.

The locking reception may be a locking groove extending over the outer circumference of the tappet, wherein the extent of the locking groove in the axial direction of the tappet is larger than the extent of the locking element in the axial direction of the tappet. The axial moveability of the tappet of the first actuation part with respect to the locking element and consequently the second actuation part in the locking position is thereby achieved in a particularly simple manner. At the same time, such a locking groove produces particularly reliable locking, which is not dependent on the rotational orientation of the tappet.

The actuation device may further comprise an unlocking device, wherein the unlocking device comprises drive means which can be actuated such that the locking element is retracted from the locking reception. The unlocking device may be able to be actuated from a location which is remote from the actuation part. It may thus be a remote-controlled unlocking device. The actuation device may further comprise a control device, which is connected to the sensor device and receives a sensor signal of the sensor device. The control device therefore receives a signal from the sensor device when it identifies a relative movement between the first and second actuation part in the locking position. On this basis, the control device, as already explained in the introduction, may carry out various measures. For example, the control device may be designed to de-air a highly pressurized tank of an automobile which is closed by the flap, when the sensor device detects a relative movement between the locking element and the locking reception in order to substantially adapt the pressure in the tank to the ambient pressure. As explained in the introduction, this is particularly necessary with hybrid vehicles in which the tanks are often under considerable pressure. Furthermore, the control device may be designed to control the unlocking device for retracting the locking element from the locking reception when the sensor device detects a relative movement between the locking element and the locking reception. The control device therefore performs an unlocking of the first actuation part from the second actuation part so that the flap can be opened. It is also possible to design the control device to first de-air a tank of an automobile which is closed by the flap when the sensor device detects a relative movement between the locking element and the locking reception and subsequently to release the locking between the first and second actuation part.

According to another embodiment, there may be provision for the locking element to be a locking bar moveable by the drive means in a radial direction with regard to the movement direction of the tappet between an unlocking position retracted from the locking reception and a locking position being inserted into the locking reception. The locking bar may be pretensioned into its locking position by bar spring means. To this end, the locking bar may, for example, be constructed in a fork-like manner and engage with the free end thereof in the locking reception. The bar spring means may, for example, comprise a spring which acts on one end of the locking bar and which is compressed when the locking bar moves out of the locking reception.

According to a particularly practical embodiment, the drive means may comprise an electric motor. However, alternatively or additionally, the drive means may also comprise an actuation cable which may, for example, be able to be operated manually. This may be important, for example, for emergency unlocking when the battery of an automobile is discharged.

As long as the drive means comprise an electric motor, the motor may, for example, via a toothed wheel having an external toothed arrangement, be in engagement with a corresponding internal toothed arrangement of a worm gear. The worm gear may, for example, have a helical guiding groove at the upper side or the lower side thereof. The locking bar may then, for example, have at the lower side or upper side thereof a guiding projection which is in engagement with the guiding groove. If the worm gear is now rotated by means of the electric motor, the guiding projection is moved inward along the helical guiding groove in a radial direction in the direction towards the centre of the worm gear. The locking bar is thus in turn moved in a radial direction away from the tappet so that it moves out of engagement with the locking reception. This movement of the locking bar can be carried out counter to the pretensioning provided by the bar spring means. A radially outward beginning and a radially inward end of the guiding groove may be connected to each other by means of a connection portion which extends in a radial direction. In this embodiment, the guiding projection of the locking bar, driven by the bar spring means, starting from the radially inward end of the helical guiding groove, can move radially outwards again through the connection portion which extends in a radial direction so that the locking bar can again engage in the locking reception so as to be locked again. A rotation of the worm gear for this purpose is then simply not necessary. The worm gear can be rotated between the locking position and the unlocking position of the locking bar, in particular through approximately 360°.

The guiding groove of the worm gear may further have at the radially inner end thereof a stop which the guiding projection of the locking bar strikes when the unlocking position is reached. The stop constitutes a defined end point for the rotational movement of the worm gear. Consequently, the electric motor does not necessarily have to be driven to a defined end position, but may be driven in a simple manner until it reaches the stop. Such motors travel very fast so that precise control to an end point would be complex.

According to another embodiment, the first actuation part, driven by a spring pretension, detaches from the second actuation part and can move together with the flap at least partially into its opened position when the locking element is retracted from the locking reception. The resilient means may in particular comprise a spring which, when the first actuation part is locked on the second actuation part, is compressed by the first actuation part. A particularly simple structure is thereby achieved. The resilient means provide a resilient pretensioning which seeks to release the first actuation part, from the position locked with the second actuation part, from the second actuation part again so that the flap with the first actuation part is at least partially opened. The locking element retains the first actuation part in the locking position counter to this resilient pretensioning so that the first actuation part cannot be released from the second actuation part. A flap which is connected, for example, to the first actuation part cannot therefore be opened. If the locking position is now released, by the locking element being brought out of engagement with the locking reception by the drive means, the resilient pretensioning moves the first actuation part together with the flap away from the second actuation part, the flap moving into an at least partially opened position. The effect of the resilient pretensioning for opening the flap is carried out directly so that the flap independently opens at least partially. In particular in this embodiment, no manual pressing in of the flap in the context of a push-push function is required for this at least partial opening. Subsequently, the partially opened flap can then be gripped by hand and completely opened. However, it is also conceivable for the flap to independently move completely into the open position thereof, driven, for example, by means of an appropriate resilient force.

Alternatively, it is also possible for the actuation parts to be held on each other in an arresting position after a predetermined first stroke of the first actuation part in the direction of the second actuation part and a subsequent back stroke of the first actuation part, wherein the arresting position is released by a predetermined second stroke of the first actuation part in the direction of the second actuation part, wherein the first actuation part and the second actuation part are disengaged. In this embodiment, the actuation device thus has push-push kinematics. After releasing the locking, the actuation parts in this embodiment are still held on each other in an arresting position. This can be released, for example, by manually pressing in the flap so that the first actuation part moves away from the second actuation part, an at least partial opening of the flap being carried out. Again, the partially opened flap can then be gripped by hand and completely opened. Again it is also conceivable for the flap to move independently completely into the open position thereof, driven, for example, by means of an appropriate resilient force. In order to assume the arresting position again, the flap can be closed again, the arresting position between the actuation parts being produced again, as known per se with such devices having push-push kinematics. A locking operation can subsequently be carried out again by the locking element engaging in the locking reception.

According to a particularly suitable embodiment of the push-push function, there may be provision for the tappet to comprise a control curve on its outer circumference and for the housing to comprise a control ring mounted axially fixed and rotatable in the housing, wherein the control ring comprises at least one control projection on its inner circumference, wherein the tappet enters the control ring during engagement of the actuation parts with one another, wherein the at least one control projection of the control ring engages with the control curve of the tappet so that after the predetermined first stroke and the subsequent back stroke the tappet is held on the control ring in the arresting position, and wherein the tappet is released from the arresting position on the control ring by the second predetermined stroke so that the tappet exits the control ring again, wherein the at least one control projection of the control ring and the control curve of the tappet disengage.

The invention also relates to a component with a flap moveably mounted on the component between a closed position and an opened position, in particular a housing of an automobile with a flap mounted moveably on the housing, comprising an actuation device according to the invention. The first actuation part may, for example, be fastened on the flap. The second actuation part may, for example, accordingly be fastened on the component. The flap may in turn be a flap in or on an automobile or outside an automobile, as explained in the introduction to claim 1, for example, a fuel tank or charging flap.

The sensor device may then further be designed to detect a closed position and/or opened position of the flap. Using the control device, on the basis of a corresponding signal of the sensor device, with the flap opened and/or closed, various functions can then be actuated. For example, when an opened position of the flap is detected, an illumination of the filling or charging housing can be actuated. It is also conceivable, when an opened position of the flap is detected, for a warning signal to be sent to an on-board instrument of a vehicle which is provided with the component. Characteristic values, such as a charging or filling state of the vehicle, can further be sent to a mobile data device, for example, a mobile telephone, for example, via SMS.

Figure 2:
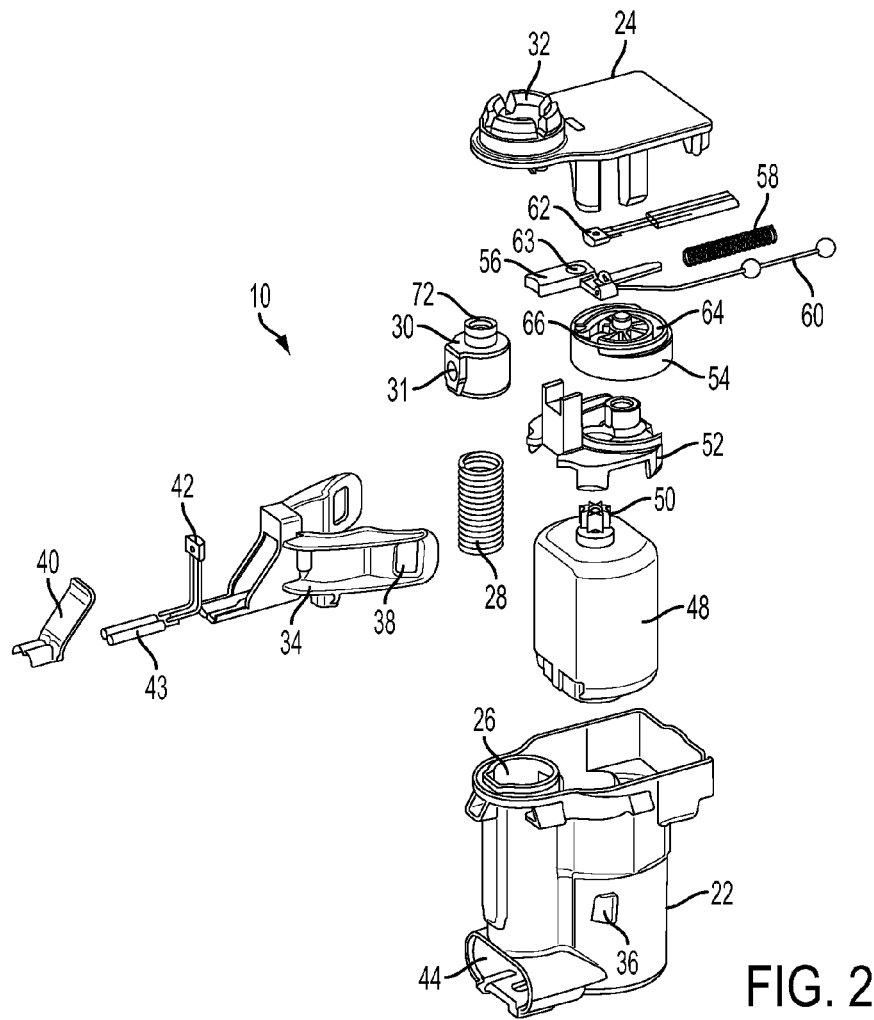
Figure 3:
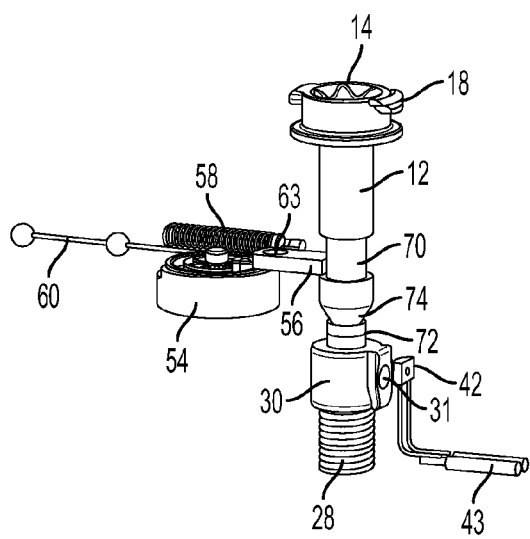
Figure 4:
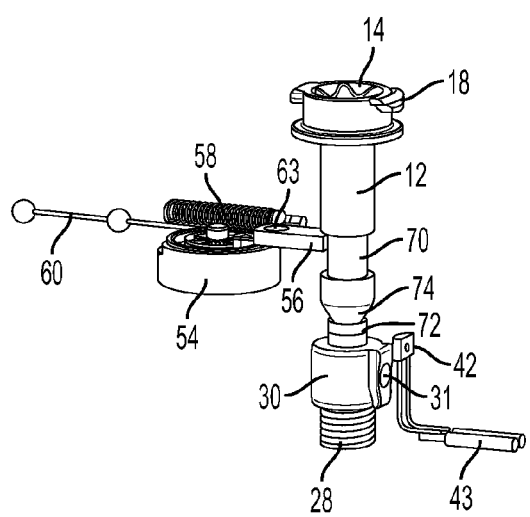
Figure 5:
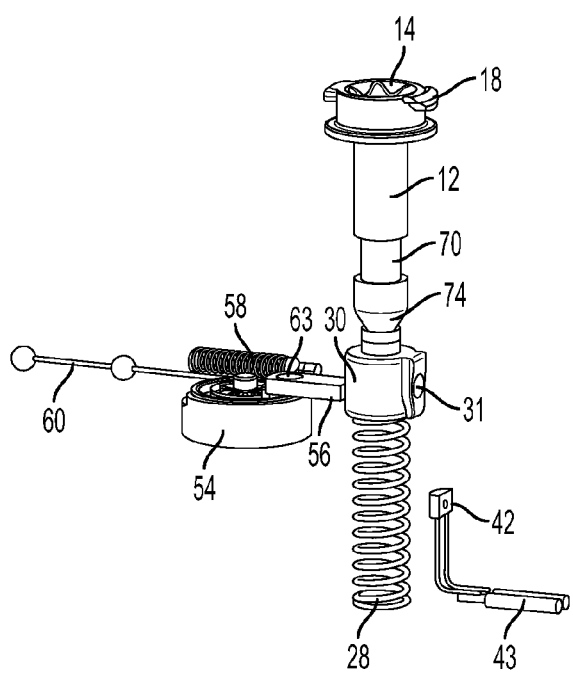

An embodiment of the invention is explained in greater detail below, with reference to the schematic figures, in which:

FIG. 1 is a perspective view of an actuation device according to the invention, FIG. 2 is an exploded view of part of the actuation device of FIG. 1, FIG. 3 is a perspective view of part of the actuation device from FIG. 1 in a first operating position, FIG. 4 is a perspective view of a part of the actuation device from FIG. 1 in a second operating position, and FIG. 5 is a perspective view of a part of the actuation device from FIG. 1 in a third operating position.

Unless indicated otherwise, the same reference numerals in the figures refer to the same objects. FIG. 1 shows an actuation device 10 according to an invention for a component which is not shown, in this instance a fuel housing of an automobile, a flap which is moveably supported between a closed position and an opened position and which is also not shown, in this instance a fuel tank flap. The actuation device 10 comprises a first actuation part having a tappet 12, of which only the head 14 can be seen in FIG. 1. The tappet 12 is concealed by a seal which surrounds the periphery of the tappet 12, in this instance a resilient bellows 16. At the head 14 of the tappet 12 are projections 18 by means of which the tappet 12 can be secured to the flap in the manner of a bayonet connection. The actuation device 10 further has a second actuation part having a housing 20. As can be seen in particular in FIG. 2, the housing 20 substantially comprises a housing base member 22 and a housing cover 24. The first actuation part of the actuation device 10 is not illustrated in FIG. 2. The base member 22 of the housing 20 has a substantially cylindrical receiving opening 26 in which a spring 28 and a bolt 30 are received. The housing cover 24 has an inlet opening 32 for the tappet 12, the lower side of the inlet opening 32 forming a stop face for the bolt 30 so that it is pretensioned in the cylindrical receiving opening 26 by the spring 28 against the housing cover 24 and can be moved in an axial direction counter to the resilient pretensioning 28. A housing bracket 34 is secured to the housing base member 22 in a snap-fitting manner by means of recesses 38 which engage in projections 36 on the housing base member 22. During operation, the bracket 38 is closed by a cover 40. Within the bracket 38 a first Hall sensor 42 of a sensor device according to the invention is arranged. By means of contact lines 43, it can be connected to an electrical power supply and a control device which is not illustrated.

Via a contacting opening 44 of the housing base member 22, an electrical power supply 46 can be connected (see FIG. 1). The electrical power supply serves inter alia to operate an electric motor 48 which is received in the housing base member 22. The electric motor 48 has at the upper side thereof a toothed wheel 50 having an external toothed arrangement. A worm gear 54 is rotatably mounted on a bearing 52, the worm gear 54 having at a lower side an inner toothed arrangement which in the assembled state meshes with the toothed wheel 50 of the electric motor 48. There is further shown in FIG. 2, under the reference numeral 56, a locking element in the form of a locking bar 56 which, in the assembled state, is pretensioned by means of a spring 58 in a radial direction into the receiving opening 26. A wire pull 60 for a manual emergency unlocking is further connected to the locking bar 56. There is further provided a second Hall sensor 62 which detects the radial position of the locking bar 56. To this end, a magnet 63 is provided on the locking bar 56. As shown in FIG. 1, a handle 65 which is intended to be operated manually may be connected to the wire pull 60.

The function of the actuation device 10 according to the invention is now intended to be explained with reference to FIGS. 3 to 5. In these figures, three different operating states of the actuation device 10 are shown. In this instance, the majority of the second actuation part is not illustrated for reasons of clarity. Instead, the tappet 12 of the first actuation part is shown, but without the seal 16 thereof.

FIG. 3 illustrates the locking position of the actuation device according to the invention. In this state, the locking bar 56 is in engagement with a locking reception 70 which extends over the outer periphery of the tappet 12 in the form of a peripheral locking groove 70. It can be seen, for example, in FIG. 2, that the worm gear 54 has at the upper side thereof a helically extending guiding groove 64 whose radial inner end is formed by a stop face 66. The locking bar 56 has, at the lower side thereof, a guiding projection which cannot be seen in the figures and which engages in the guiding groove 64. In the locking position shown in FIG. 3, the flap is in the closed state and the tappet 12 of the first actuation part is locked in the housing 20 of the second actuation part. To this end, as already explained, the locking bar 56, driven by the spring 58, is located in the locking position thereof, in which it protrudes with the free end thereof radially into the cylindrical opening 26 and engages in the locking groove 70. The extent of the locking groove 70 in an axial direction of the tappet 12 is greater than the extent of the locking bar 56 in the axial direction of the tappet 12. In particular, the width of the locking groove 70 is more than double the thickness of the locking bar. The spring 28 retains the tappet 12 in the position shown in FIG. 3, in which the lower boundary of the locking groove 70 touches the locking bar 56. In this state, the tappet 12 and with it the flap cannot be released from the second actuation part. In FIGS. 3 to 5 it can further be seen that the bolt 30 has a magnet 31 at the side thereof associated with the Hall sensor 42. In the locking position shown in FIG. 3, the magnet 31 is orientated with respect to the Hall sensor 42 and is accordingly detected by the Hall sensor 42.

Owing to the larger axial extent of the locking groove 70 in comparison with the locking bar 56, the tappet 12 and with it the flap, starting from the locking position shown in FIG. 3, can be pressed slightly axially inward into a position shown in FIG. 4. In this position, in which the spring 28 has been further compressed, the locking bar 56 touches the upper boundary of the locking groove 70. This pressing in of the flap and consequently the tappet can be carried out, for example, manually. The magnet 31 is consequently also displaced in an axial direction relative to the Hall sensor 42 which can consequently indirectly detect the movement of the tappet 12 or the flap by means of the movement of the magnet. As already mentioned, the Hall sensor 42 is connected to a control device (not shown) of the actuation device 10 according to the invention and transmits to it a corresponding detection signal. The actuation device 10 according to the invention may, for example, be used for a fuel tank flap of a hybrid vehicle in which the tank is under considerable pressure with respect to the environment. The pressing in of the flap and consequently the tappet 12 from the position shown in FIG. 3 to the position shown in FIG. 4 is considered by the control device to be a signal from a user of the automobile that he would like to open the flap in order to fill the tank. The control device therefore first controls a valve arrangement, via which air is removed from the tank so that a pressure compensation is carried out with respect to the environment. Subsequently, the control device controls the electric motor 48 so that it drives the worm gear 54 in rotation. During this rotation, the guiding projection of the locking bar 56 guided in the guiding groove 64 of the worm gear 54 is guided along the helical guiding groove 64 radially inwards in the direction of the centre of the worm gear 54. The locking bar 56 is accordingly pulled radially out of the locking groove 70. The movement of the locking bar 56 in a radially outward direction driven by the electric motor 48 is carried out counter to the pretensioning provided by the spring 58. A rotation of the worm gear 54 through 360° can be carried out until the guiding projection reaches the stop 66 of the guiding groove 64. As soon as the locking bar 56 has been pulled out of the locking groove 70, the bolt 30, driven by the spring 28, presses the tappet 12 upward as far as the position shown in FIG. 5 in which the bolt 30 touches with its upper side the lower side of the housing cover 24 not shown in FIG. 5. The locking bar 56 then rests in this unlocking position on the outer face of the bolt 30. The tappet 12 has moved upward by a defined amount with respect to its position in FIG. 3 and with it the flap which is now located in an at least partially opened position. The flap can now be manually pivoted open completely, for example, together with the tappet 12. However, it is also conceivable for the flap 12, driven by an appropriate resilient force, to independently pivot open into the completely opened position. Owing to the previous removal of air, reliable filling of the vehicle tank is now possible.

If the flap is subsequently intended to be locked again, the flap only has to be pressed manually inwards out of the state shown in FIG. 5. The locking bar 56, driven by the spring 58, is guided via the outer contour of the bolt and a contact element 72 which is provided at the upper side thereof and via the tapering portion 74 of the tappet 12 into the locking groove 70 again so that the actuation device again assumes the locking position shown in FIG. 3. The correct position of the bolt 30 can again be detected by the Hall sensor 42. Furthermore, in the position of the locking bar 56 engaging in the locking groove 70 in FIG. 3, the Hall sensor 62 detects the magnet 63 which is arranged at the upper side of the locking bar 56. Owing to the combination of the two Hall sensors 42, 62, the correct locking can thus be detected in a particularly reliable manner.

The Hall sensor 42, by means of a detection of the magnet 31 and consequently via a detection of a movement of the bolt 30, can also identify an opened and a closed state of the flap. Using the control device, on the basis of a corresponding signal of the sensor device, various functions can then be actuated as explained above, for example, an illumination and/or warning signal when the flap is opened.

As an alternative to the above-explained embodiment, it is also conceivable for the actuation device to use push-push kinematics. For example, it is conceivable in this regard for the actuation parts, after a predetermined first stroke of the first actuation part in the direction of the second actuation part and a subsequent back stroke of the first actuation part to be held on each other in an arresting position, wherein the arresting position is released by a predetermined second stroke of the first actuation part in the direction of the second actuation part and the first actuation part and second actuation part are disengaged. The release of the arresting position is then accordingly only possible when the locking bar 56 is pulled back out of the locking groove 70. However, the retraction of the locking bar 56 alone in this embodiment does not yet open the flap. To this end, the corresponding push-push kinematics further have to be actuated first in order to release the arresting position.

The actuation device 10 according to the invention allows reliable locking of a flap on a component in a compact and structurally simple manner, appropriate preparatory measures still being able to be taken before the flap is opened.

The invention claimed is:

1. Actuation device for a flap mounted moveably on a component between a closed position and an opened position, in particular for a flap mounted moveably on a housing of an automobile, comprising:
   a first actuation part and a second actuation part which are designed to engage with one another in a movement direction,
   locking means with a locking reception provided on the first or second actuation part and a locking element provided on the other of first or second actuation part, wherein the locking element engages in the locking reception during engagement of the actuation parts and thus holds the actuation parts together in a locking position, wherein the locking reception has sufficient size so that in the locking position a relative movement between the locking element and the locking reception in the movement direction of the actuation parts and thereby a corresponding relative movement of the actuation parts in their movement direction with regard to one another is possible, and
   a sensor device which is designed to detect a relative movement between the locking element and the locking reception in the movement direction in the locking position.

2. Actuation device according to claim 1, wherein the first actuation part is to be fastened on the flap and moved with the flap upon a movement of the flap between the closed position and the opened position, and wherein the second actuation part is to be fastened on the component.

3. Actuation device according to claim 1, wherein the sensor device comprises a hall sensor, which detects the movement of a magnet which is moved during a relative movement between the locking element and the locking reception in the movement direction.

4. Actuation device according to claim 1, wherein it further comprises a control device which is connected with the sensor device and receives a sensor signal of the sensor device.

5. Actuation device according to claim 4, wherein the control device is designed to control the unlocking device for retracting the locking element from the locking reception when the sensor device detects a relative movement between the locking element and the locking reception.

6. Actuation device according to claim 1, wherein the first actuation part, driven by a spring pretension, detaches from the second actuation part and moves together with the flap at least partially into its opened position when the locking element is retracted from the locking reception.

7. Component with a flap mounted on the component between a closed position and an opened position, in particular housing of an automobile with a flap mounted moveably on the housing, comprising an actuation device according to claim 1.

8. Component according to claim 7, wherein the sensor device is designed to detect a closed position and/or an opened position of the flap.

9. Actuation device for a flap mounted moveably on a component between a closed position and an opened position, comprising:
   a first actuation part and a second actuation part which are designed to engage with one another,
   locking means with a locking reception provided on the first or second actuation part and a locking element provided on the other of first or second actuation part, wherein the locking element engages in the locking reception during engagement of the actuation parts and thus holds the actuation parts together in a locking position, wherein the locking reception is configured so that in the locking position a relative movement between the locking element and the locking reception in the movement direction of the actuation parts and thereby a corresponding relative movement of the actuation parts in their movement direction with regard to one another is possible, and
   a sensor device which is designed to detect a relative movement between the locking element and the locking reception in the movement direction in the locking position.

10. Actuation device according to claim 9, wherein one of the actuation parts comprises a tappet on the outer circumference of which the locking reception is provided and, in that the other of the actuation parts comprises a housing in which the locking element is moveably mounted, wherein the tappet enters the housing in axial direction through an entrance opening for reaching the locking position, whereby the locking element engages with the locking reception.

11. Actuation device according to claim 10, wherein the actuation part comprising the housing further comprises a bolt mounted axially moveable in the housing, wherein the bolt is pretensioned in the direction of the entrance opening of the housing by spring means, wherein the tappet presses the bolt against the spring means during an axial movement into the housing and thereby pretensions the spring means.

12. Actuation device according to claim 11, wherein the magnet is provided on the bolt.

13. Actuation device according to claim 10, wherein the locking reception is a locking groove extending over the outer circumference of the tappet, wherein the extension of the locking groove in the axial direction of the tappet is larger than the extension of the locking element in the axial direction of the tappet.

14. Actuation device according to claim 9, wherein it further comprises an unlocking device wherein the unlocking device comprises drive means, which can be actuated such that the locking element is retracted from the locking reception.

15. Actuation device according to claim 14, wherein the control device is designed to de-air a tank of an automobile which is closed by the flap, when the sensor device detects a relative movement between the locking element and the locking reception.

16. Actuation device according to claim 14, wherein the locking element is a locking bar moveable by the drive means in a radial direction with regard to the movement direction of the tappet between an unlocking position being retracted from the locking reception and a locking position being inserted into the locking reception.

17. Actuation device according to claim 16, wherein the locking bar is pretensioned into its locking position by bar spring means.

18. Actuation device according to claim 14, wherein the drive means comprise an electric motor.

19. Actuation device according to claim 9, wherein the actuation parts are held on each other in an arresting position after a predetermined first stroke of the first actuation part in the direction of the second actuation part and a subsequent back stroke of the first actuation part, wherein the arresting position is released by a predetermined second stroke of the first actuation part in the direction of the second actuation part, whereby the first actuation part and the second actuation part are disengaged.

20. Actuation device according to claim 9, wherein the flap is mounted moveably on a housing of an automobile.

* * * * *